United States Patent [19]

Hinton et al.

[11] Patent Number: 5,351,070
[45] Date of Patent: Sep. 27, 1994

[54] SINGLE PASS COLOR PRINTER HAVING IMPROVED PROCESS AND SLOW REGISTRATION

[75] Inventors: John H. Hinton, Ontario; William J. Nowak; Daniel W. Costanza, both of Webster, all of N.Y.

[73] Assignee: Xerox Corporation, Stamford, Conn.

[21] Appl. No.: 825,463

[22] Filed: Jan. 24, 1992

[51] Int. Cl.⁵ .................................... H04M 1/21
[52] U.S. Cl. .................................... 346/108
[58] Field of Search ............... 346/108, 107 R, 76 L, 346/1.1, 160; 359/211, 219

[56] References Cited

U.S. PATENT DOCUMENTS 5,153,608 10/1992 Genovese ........................ 346/108
5,212,381 5/1993 Appel et al. ................... 250/236

Primary Examiner—Mark J. Reinhart

[57] ABSTRACT

A single pass highlight color printer is disclosed which utilizes two pairs of Raster Output Scan (ROS) systems mounted symmetrically about a common polygon motor assembly. Four identical optical systems are thus provided, 180° apart with diode laser outputs directed from a ROS frame parallel and separated to allow the appropriate spacing for xerographic components situated adjacent the xerographic belt. Each ROS unit includes a 90° mirror pair which is mounted on a roof mirror carriage which in turn is connected to a focus carriage via a flexible guide system. The interaction between the focus carriage and the roof mirror carriage enables a skew alignment and process (beam steering) adjustment to be accomplished with a high degree of precision.

5 Claims, 7 Drawing Sheets

SINGLE PASS COLOR PRINTER HAVING IMPROVED PROCESS AND SLOW REGISTRATION

BACKGROUND OF THE INVENTION AND PRIOR ART STATEMENT

This invention relates to a single pass color printer and, more particularly, to a printer which uses a plurality of laser beams applied to a common scanning mechanism and directed therefrom onto separate exposure areas of a photoreceptor belt or a plurality of photoreceptor drums.

Reproducing or copying color originals through a xerographic process has, in the past, entailed the sequential production of three color separation images of the colored original, with independent development thereof by cyan, magenta and yellow toners. The images so formed are transferred onto the copy substrate material in registered overlaying relationship, with the resulting composite color image being fused to provide a permanent full color reproduction of the original.

In the aforedescribed color process, black is obtained through an amalgam of the three color toners. However, it is often useful to provide a separate processing unit devoted solely to black. Because of the need to process three and possibly four color separation images for each copy, the copy output is often very low. Where a single photoconductive drum is used for example, normally each color separation image is created, developed, and transferred to the copy substrate material before the next is started.

In order to increase the throughput of printers producing multilayer images, single pass, multiple exposure systems have been developed and are known in the art. There are a variety of methods known for creating multiple ROS single pass color printer architectures. A desirable configuration, because of the high throughput, is the tandem system where multiple exposures are simultaneously produced on separate photoreceptor drums. Each exposure is developed by a dedicated development system and transferred, in registration, to a transfer image belt from which the transfer image is then transferred, in turn, to an output sheet and then fused. For example, U.S. Pat. Nos. 4,847,642, 4,912,491; and 4,916,547 disclose single pass color systems utilizing four separate exposure stations associated with four photoreceptor drums. Each exposure station includes a dedicated optical system consisting of a laser, polygon scanner, and beam shaping optics. Each exposure is developed on an associated photoreceptor drum and transferred sequentially to a copy sheet passing along a common transfer station.

Ricoh publication 1-151370 discloses a tandem architecture where dual optical systems are symmetrically located 180° apart from two separate polygons mounted on a common shaft. Thus, four beams are generated with two parallel beams being reflected from one side of the polygon and two beams from the other side.

Ricoh Pat. No. 4,761,046 discloses another tandem system which teaches four separate optical exposure stations utilizing a single holographic spinner member. The scanning beams are directed to different sectors of the spinner and diffracted therefrom to expose the associated photoreceptor drum.

Xerox Pat. No. 4,370,047 discloses, in FIG. 4, a tandem architecture utilizing four scanning systems with a single polygon scanner.

The present invention is directed towards a printer which is capable of printing two color (highlight color) or full color prints, utilizing two or four identical optical systems respectively, positioned in a mirror design around a common motor polygon assembly. Thus, the laser outputs are projected from a common housing frame in parallel paths which are separated to allow the appropriate spacing for xerographic components (drums, belts, xerographic processing stations, etc.). The scanned beams form the associated color images on the dedicated drum or on image frames of a photoreceptor belt. A consistent problem in prior art systems is to form each of the successive image exposures within a high degree of registration. Each image must be registered to within a 0.1 mm circle or within a tolerance of +0.05 mm. Each color image must also be registered in both the photoreceptor process direction (process and skew registration) and in the direction perpendicular to the process direction.

According to a first aspect of the present invention, the registration requirements for a single pass system utilizing a photoreceptor belt are met by mounting a mirror carriage assembly containing a 90° mirror pair assembly on a focus carriage which is translatable in the direction parallel to the scanned beams. Each exposure system is initially adjusted by moving this focus carriage in a direction along the optical path until the scan line at the photoreceptor is at optimum focus. This focus adjustment is performed at initial installation and is normally not repeated. A skew adjustment is then made to compensate for the unique conicity error associated with the belt. The final process direction registration adjustment (referred to as beam steering) is made by translating a mirror carriage in the process or reverse process direction. The skew and process adjustments may be repeated during operation, upon detection of registration errors. More particularly, the present invention relates to an imaging system for forming multiple image exposure frames on a photoconductive belt moving in a process direction during a single pass including:

a photoreceptor belt adapted to accommodate the formation of an integral number of image exposure frames, a plurality of Raster Output Scanners (ROS) units, each ROS unit generating image-modulated scan lines which are transmitted along an optical path to an associated image exposure frame, said ROS units located in a comon housing and positioned symmetrically on opposite sides of two polygon scanners mounted vertically on a common rotating shaft, said ROS units each comprising:

a diode laser, means for modulating the output of said laser with input video data, optical means for collimating and expanding the laser output and directing the output against an associated polygon scanner, post polygon lens group for correcting for $f\theta$ and distortion in the reflected beam, a 90° roof mirror assembly mounted on a movable mirror carriage which folds the corrected beam from the post polygon lens group in a 180° path reversal and a folding mirror for directing the scanning beam out of the ROS housing and onto the associated image exposure frame of the photoreceptor, each scanning beam being parallel to each other, the improvement wherein said roof mirror carriage is integrally mounted to a focus carriage whose position is secured to the ROS housing at a position providing an optically focused scan line at the photoreceptor surface, said roof mirror carriage adapted to be moved at one end to provide a skew registration correction to the scan line at the photoreceptor, said roof mirror carriage being further adapted to move in the process direction to provide for steering the scan line in the process direction.

DESCRIPTION OF THE INVENTION

Figure 1:
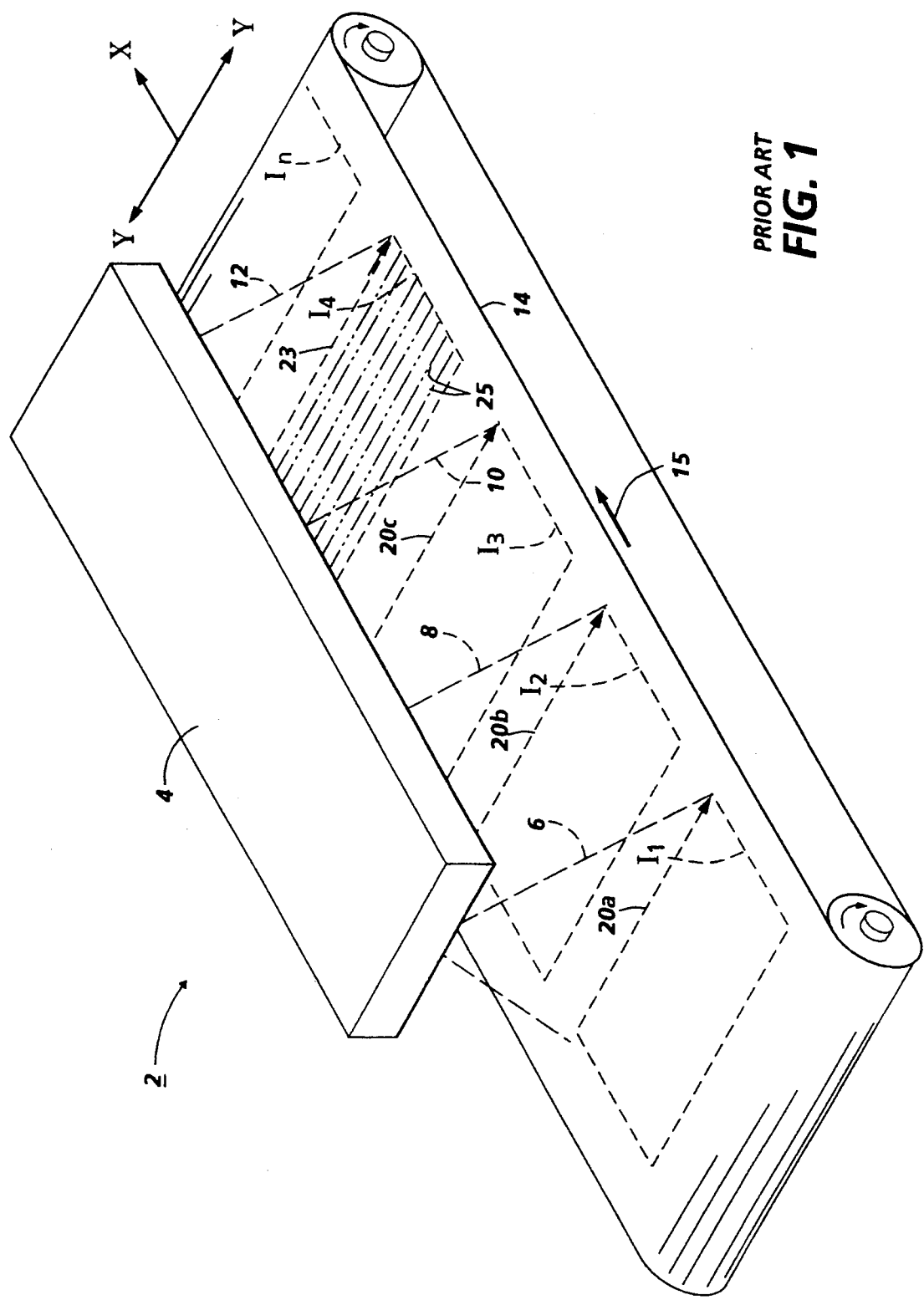
FIG. 1 shows a prior art single-pass ROS color printing system with a housing incorporating four ROS systems.

FIG. 1 shows a prior art, single pass ROS color printing system 2, which includes a ROS housing 4. System 2 produces four separate output scanning beams, 6, 8, 10, and 12. System 2 further includes a photoreceptor belt 14, driven in the process direction, indicated by the arrow 15. The length of the the belt 14 is designed to accept an integral number of spaced image areas $I_1-I_n$ represented by dashed line rectangles in FIG. 1. Upstream of each exposure station are charge devices 18, 20, 22, and 24, (FIG. 2) which place a predetermined electrical charge on the surface of belt 14. As the belt moves in the indicated direction, each image area is scanned by a succession of scan lines to provide an image exposure pattern in response to data input signals to their respective ROS. The exposure pattern begins when the leading edge of the image area reaches a transverse start-of-exposure line represented by a dashed arrow 23. The exposure pattern is formed of a plurality of closely spaced transverse scan lines 25 shown with exaggerated longitudinal spacing on image area $I_1$ Downstream from each exposure station, development system 26, 28, 30, and a fourth system (not shown) develop a latent image of the last exposure without disturbing previously developed images. A fully developed color image is then transferred by means not shown to an output sheet. System 2 is a full color printer; highlight color is provided by enabling two of the ROS systems. Further details of the operation of xerographic stations in a belt-type multiple exposure single pass system are disclosed in U.S. Pat. No. 4,660,059 and 4,791,452 whose contents are hereby incorporated by reference.

Figure 2:
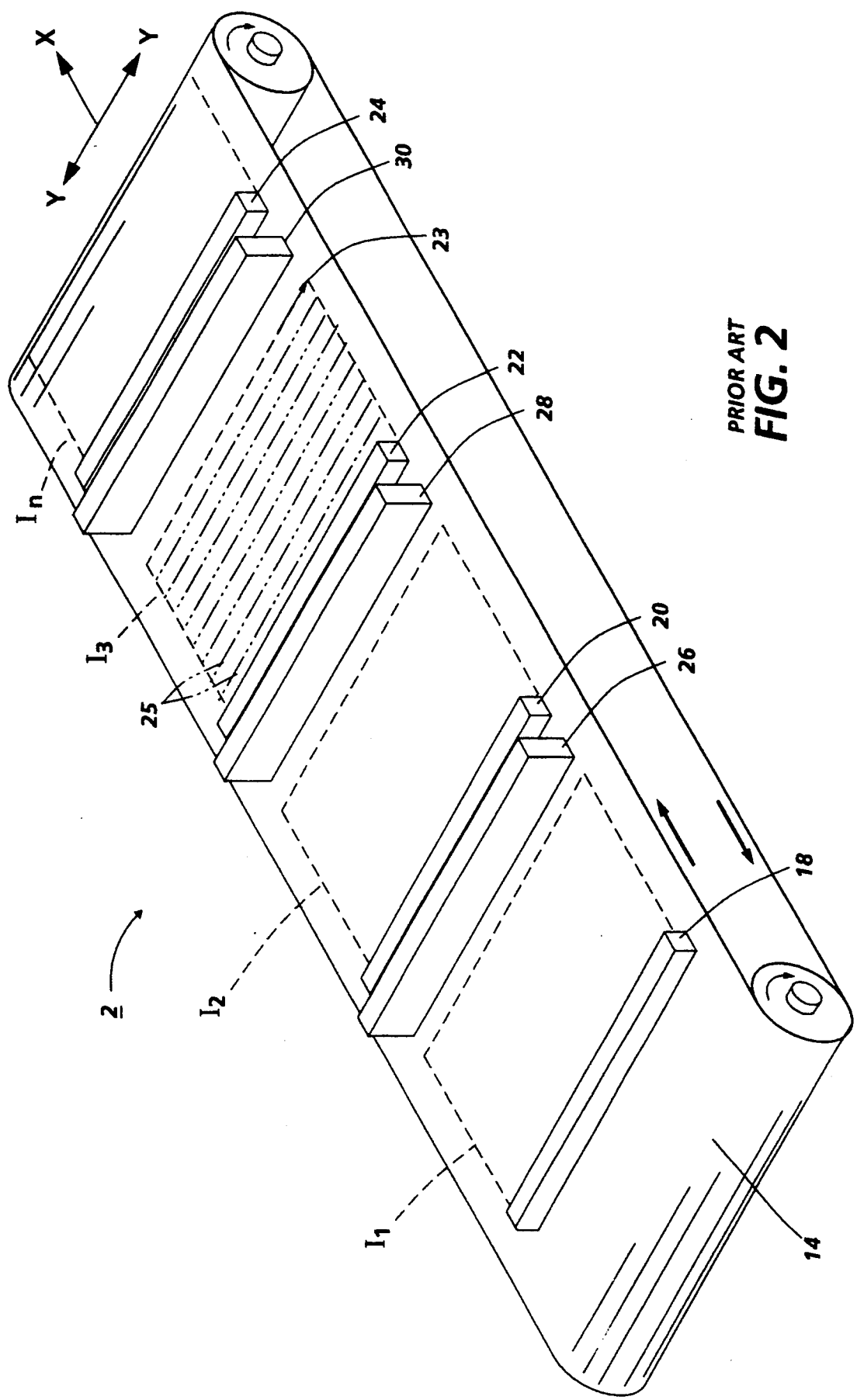
FIG. 2 shows the xerographic stations which were omitted in FIG. 1.

With such a system as that disclosed in FIGS. 1 and 2, each color image $I_1-I_n$ must be precisely aligned such that all corresponding pixels in the image areas are registered in the transverse and process direction. Current requirements call for registration tolerances of approximately 125 microns (0.005 inch). The pixels of each scan line must also be at optimum focus. This alignment must be maintained through continuous revolutions (passes) of the photoreceptor.

Figure 3:
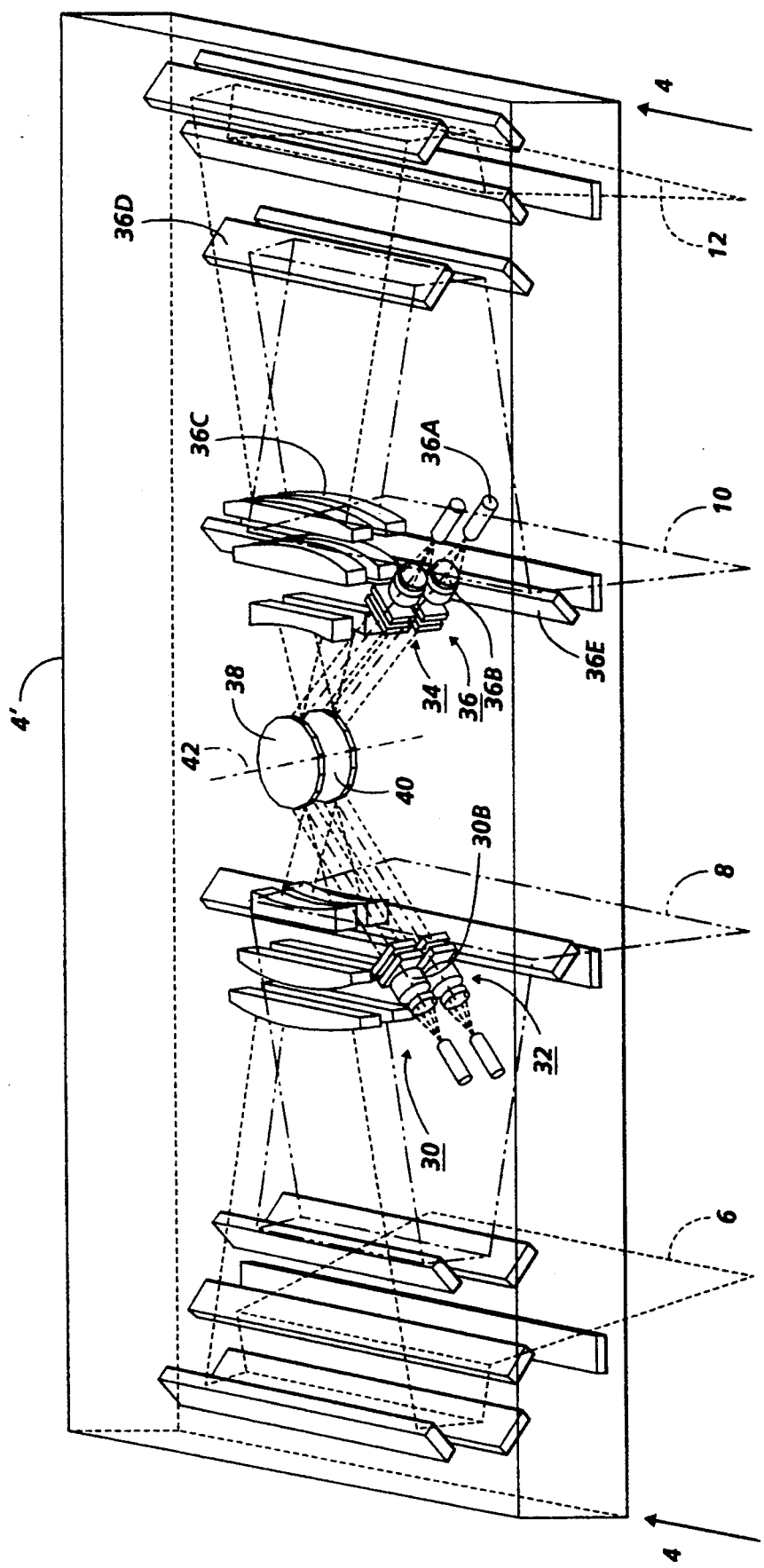
FIG. 3 is a perspective view of the interior of the ROS housing showing the alignment of four ROS optical systems about a dual polygon optical shaft.
Figure 4:
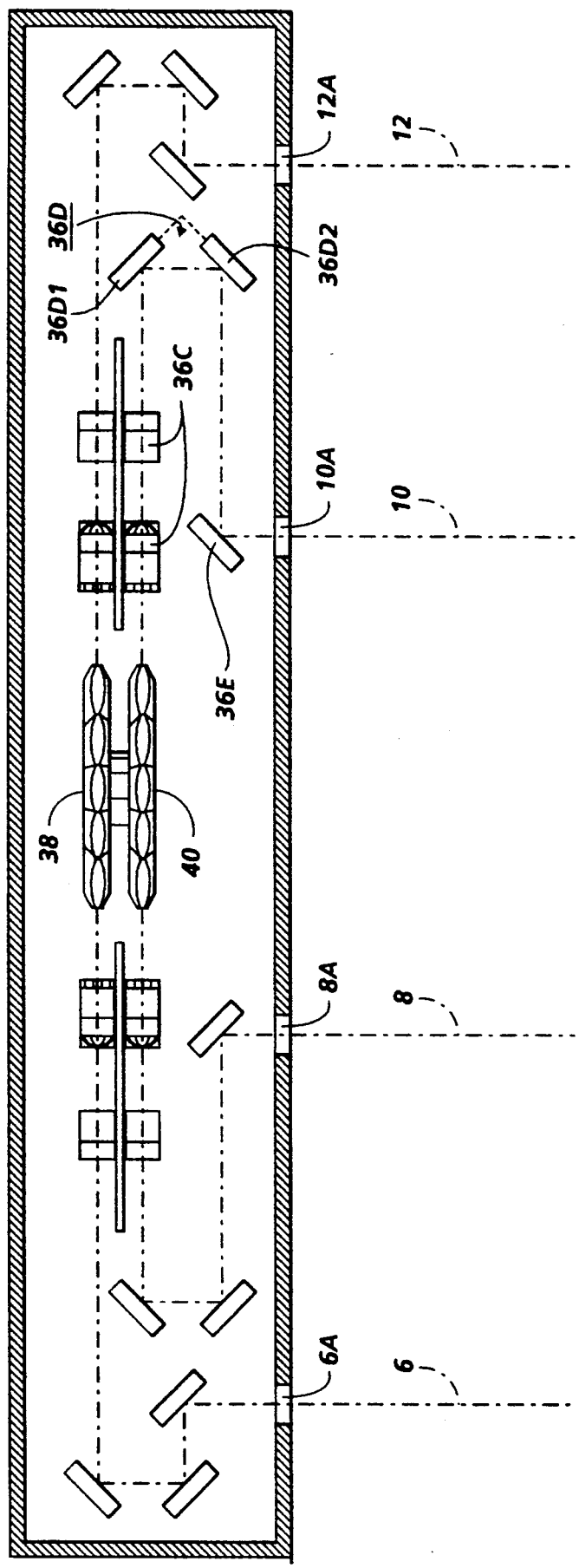
FIG. 4 is a side view of the ROS housing shown in FIG. 3.

Turning now to FIGS. 3 and 4, a ROS housing 4', of the present invention comprises four optical systems, 30, 32, 34, and 36, which are symmetrically arranged at 180° positions around two polygons 38, 40, which are rotated on a common spindle shaft 42, driven by a motor not shown. The optical systems, 30, 32, 34, and 36 are arranged so as to produce modulated scanning beams 6, 8, 10, and 12, respectively, each beam associated with a different color image. The beams are projected through apertures 6A, 8A, 10A, 12A, respectively (FIG. 4) in the housing frame onto photoreceptor 14. A description of optical system 36 follows; the optical elements comprising systems 30, 32, 34 operate in identical fashion. Considering FIGS. 3 and 4, the optical system 36 consists of a self-modulated diode laser 36A which is addressed by an input image signal representing the color image to be printed. The modulated output of laser 36A is expanded and collimated by cylindrical lens group 36B and directed against the facets of rotating polygon 40. The reflected scanning beam is transmitted along the optical path through post polygon lens group 36C which contains $f\theta$ image and distortion correcting elements to provide a corrected, focused beam. The beam is folded 180° by a 90° roof mirror assembly 36D, comprising mirrors 36D1 and 36D2, reflected from final fold mirror 36E, and scanned on the photoreceptor as beam 10.

Figure 5:
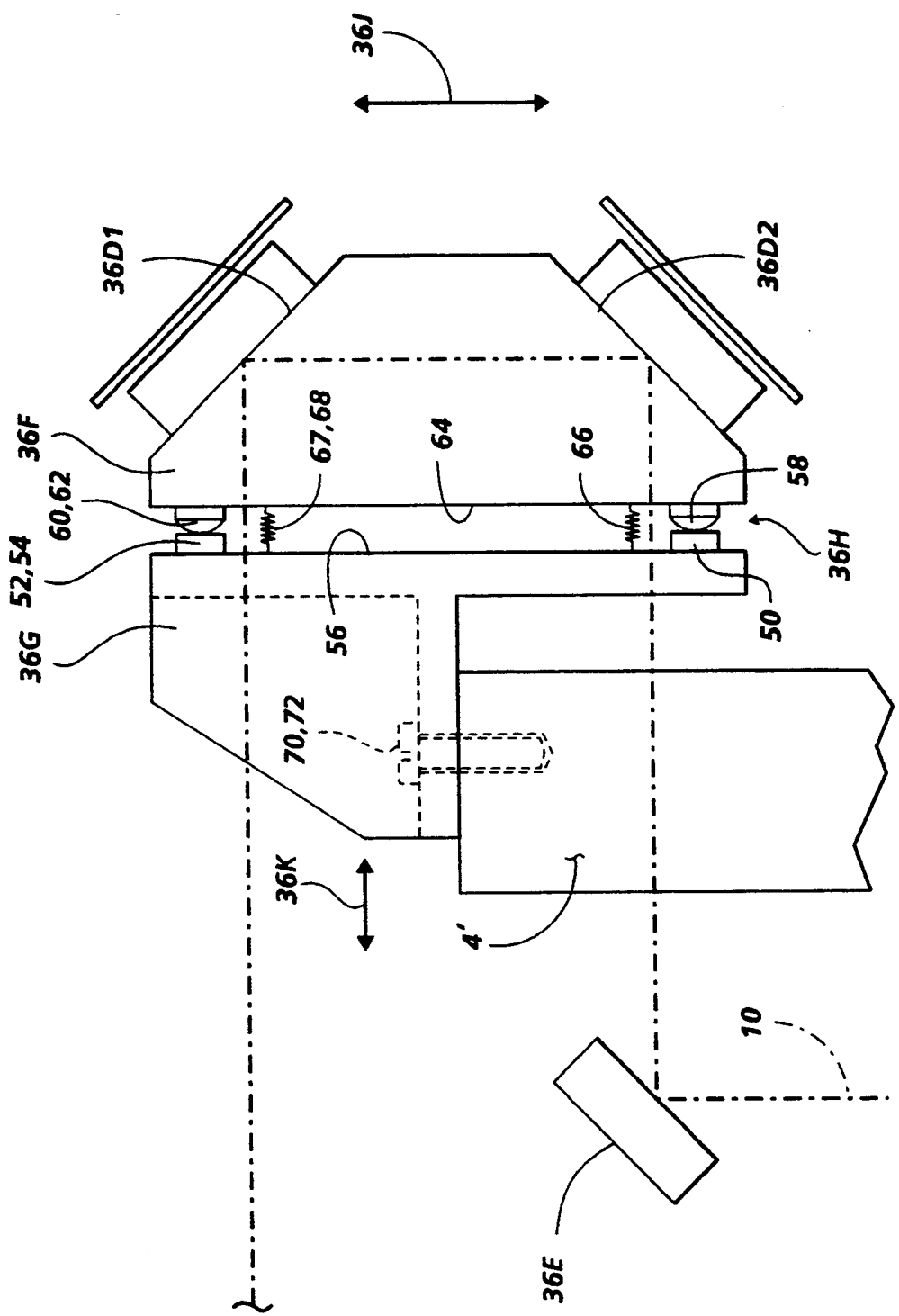
FIG. 5 is a detailed view of the use of a focus carriage and a 90° mirror carriage to achieve registration adjustments.
Figure 6:
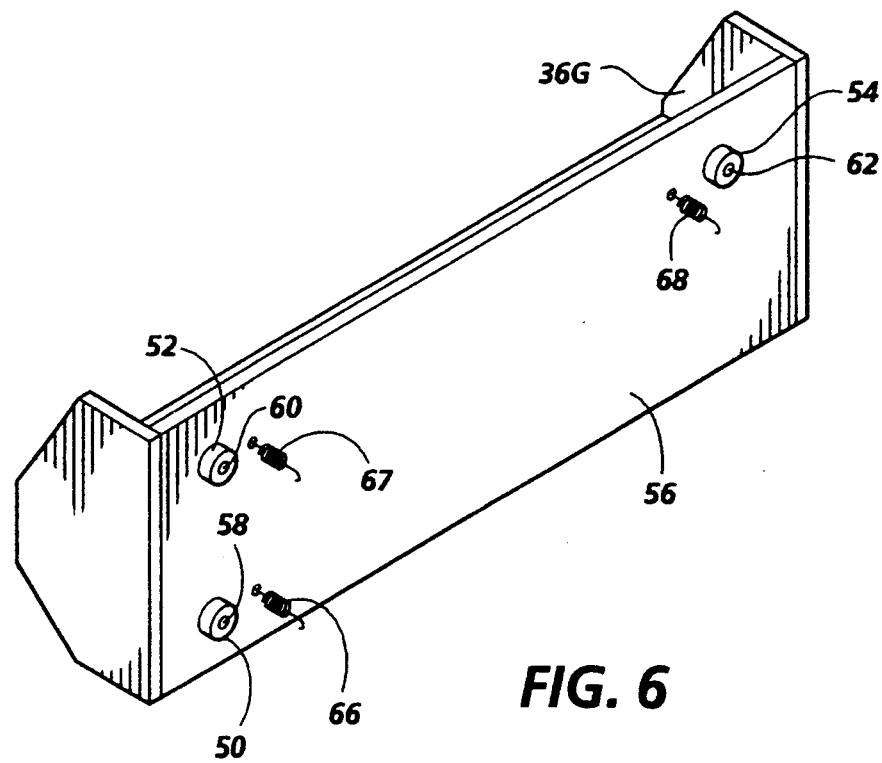
FIG. 6 is a perspective view of one surface of the focus carriage shown in FIG. 5.
Figure 7:
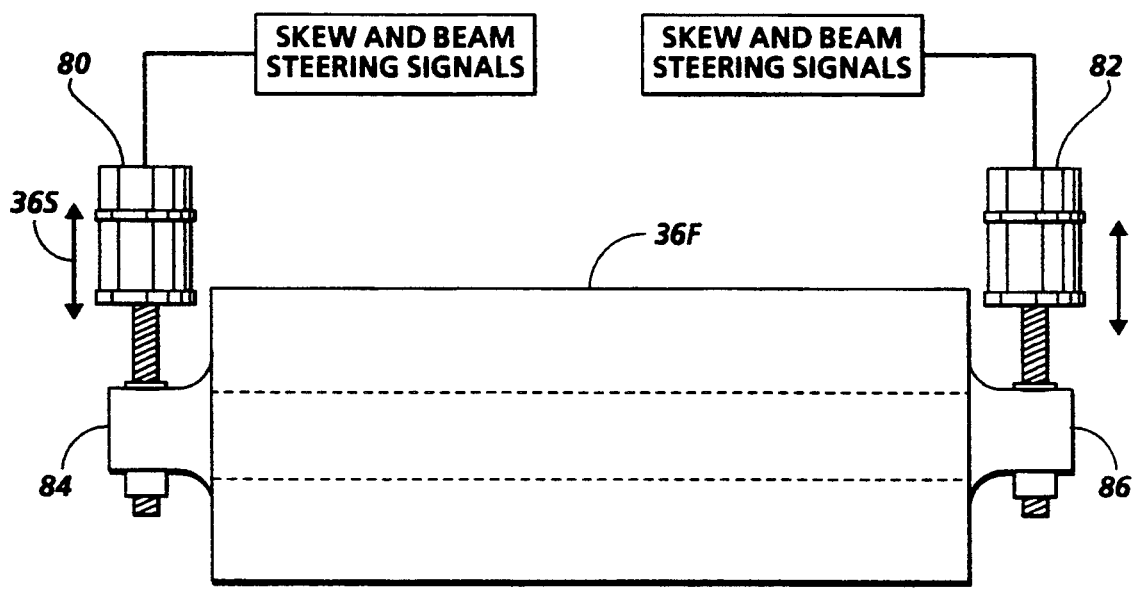
FIG. 7 shows a back end view of the mirror carriage of FIG. 5.

As shown in FIGS. 5, 6, and 7, mirrors 36D1 and 36D2 are mounted on mirror carriage assembly 36F in a 90° orientation on carriage 36F. Carriage assembly 36F is connected to a focus carriage 36G via a guide assembly 36H. Guide assembly 36H comprises, in a preferred embodiment, three hardened steel protuberances 50, 52, 54 affixed to the surface 56 of carriage 36G; three matting spherical nubs 58, 60, 62 affixed to surface 64 of carriage assembly 36F; and three springs 66, 67, 68 connected between surfaces 56 and 64. As will be described in greater detail below, guide system 36H enables a small degree of movement of carriage 36F, with respect to carriage 36G in process direction 36J.

Focus carriage 36G has a length into the page commensurate with carriage assembly 36F. Focus carriage 36G (and hence carriage 36F) can be translated in the direction of the arrow 36K relative to the ROS housing frame 4'. Translation in the 36K direction along the optical path changes the focus of the scan beam 10 at the photoreceptor 14 surface. During an initial alignment, focus carriage 36G is translated until optimum focus of beam 10 is achieved. At this time, focus carriage 36G is permanently fixed into position on the ROS frame by means of screws 70, 72.

Two additional registration errors are recognized which may require an initial and a dynamic correction. The first, skew error in the scanned beam, is a result of conicity errors during the formation of belt 14. The second, process error, reflects the need to register the lead edge of the multiple images formed on the photoreceptor in the process direction. Various techniques are known in the prior art for identifying these errors and generating correction signals which are used to adjust the scanning system to change the beam position at the photoreceptor. For example, registration marks may be formed on the photoreceptor at predetermined locations and the passage of the marks sensed by a photodetector, which generates correction signals. These signals can then be used to adjust a component in the scanning system. See, for example, U.S. Pat. No. 4,912,491. As a second example, the passage of oppositely aligned holes in a belt photoreceptor may be sensed and signals generated which are applied to actuators to adjust components in the scanning system, which, in turn, change the orientation of the scan line at the photoreceptor. See, for example, the disclosure in co-pending U.S. application Ser. No. 07/807,927.

Referring now to FIG. 7, there is shown a back view of mirror assembly carriage 36F showing two stepper motors 80, 82, threadingly engaged through integral flanges 84, 86. Motors 80, 82 can provide incremental movements of the carriage assembly of approximately $1\mu$ resulting in a $2\mu$ motion of the scan beam 10 at the photoreceptor. For a skew correction, either motor 80 or 82 is actuated to translate the associated end of carriage 36F. For a process direction correction, both motors are simultaneously activated to drive the carriage along line 36J, line 36J representing the process direction motion of belt 14 in the X direction (FIG. 1). Thus, process direction and skew motion is enabled by the nature of guide system 36H. As shown in FIG. 6, when a skew or process direction motion is applied to 36F, spherical nubs 58, 60, 62, having a concave mounting surface, slide along the planar surface of associated protuberances 50, 52, 54. Since the degree of motion, measured in microns, is quite small, relative to the diameter of the protuberances, the nubs will always remain in contact with the flat surfaces. Springs 66, 67, 68 provide the requisite flexibility to accommodate such small motions while still maintaining the connection between the two assemblies.

Optical systems 30, 32, and 34, have identical optical components 30A–30H, 32A–32H, and 34A–34H, respectively. Optical system 32 along with system 36 utilize the scanning facets of polygon 40, while systems 30, 34 are associated with the facets of polygon 38. Each laser 30A, 32A, 34A, and 36A are addressed by image signals representative of the particular color to be exposed and developed by the associated ROS system. Each system is adjusted, as described above. With continued operation of the system, periodic skew and beam steering corrections may be required (dynamic corrections). These can be accomplished as described above.

Figure 9:
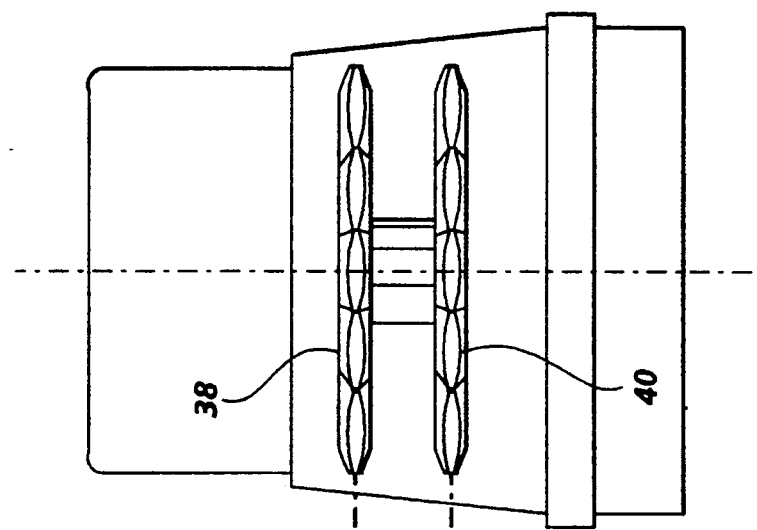
FIGS. 8 and 9 show a preferred embodiment for the location of the laser diodes used to generate the scanning beams.
Figure 8:
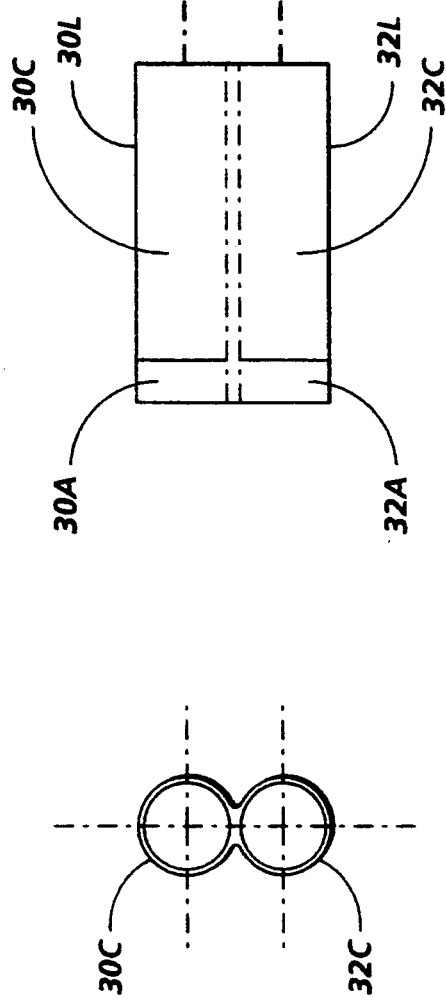

As a further feature of the present invention, the laser pairs 30A, 32A, and 34, 36 can be preferentially mounted, as shown in FIGS. 8 and 9, to the end (rear) of barrel assemblies 30L, 32L, which house collimator lens 30C, 32C, respectively. The advantage of so combining these elements is to enable a more compact design and to eliminate initial adjustments required for at least a laser diode mountings. Further, almost any angle can be formed between the central angle of the laser outputs and the post polygon lens groups 30C, 32C, 34C, 36C.

While the invention has been described with reference to the structures disclosed, it is not confined to the details set forth, but is intended to cover such modifications or changes as they come within the scope of the following claims. For example, while the preferred embodiment utilized multiple imaging stations on a photoreceptor belt, the invention may be utilized in a tandem printing system wherein scan lines 6, 8, 10, 12, shown in FIG. 3, are directed to separate photoreceptor drums. The image formed on each drum is then sequentially transferred in registration to a transfer belt by techniques known in the art.

What is claimed is:

1. An imaging system for forming image exposure frames on a photoreceptor belt moving in a process direction during a single pass including:
   a plurality of Raster Output Scanners (ROS) units, each ROS unit generating image-modulated scan lines which are transmitted along an optical path to form said image exposure frames, said ROS units located in a common housing and positioned symmetrically on opposite sides of two polygon scanners mounted vertically on a common rotating shaft, said ROS units each comprising:
   a diode laser for generating a beam output,
   means for modulating the beam output of said laser with input video data,
   optical means for collimating and expanding the modulated laser beam output and directing the collimated and expanded output against an associated polygon scanner,
   post polygon lens group for correcting $f\theta$ and distortion in the reflected beam thereby producing a corrected scanning beam,
   a 90° roof mirror assembly mounted on a movable mirror carriage which folds the corrected scanning beam from the post polygon lens group in a 180° path reversal and
   a folding mirror for directing the corrected scanning beam out of the common housing and onto the photoreceptor belt, each scanning beam being parallel to each other,
   the improvement wherein said roof mirror carriage is integrally mounted to a focus carriage and secured to the common housing at a position providing an optically focused scan line at the photoreceptor belt surface, means for incrementally moving, said roof mirror carriage to provide a skew registration correction to the scan line at the photoreceptor belt surface, and to provide a process registration direction correction to the scan line at the photoreceptor surface;

2. The system of claim 1 wherein said focus and mirror carriages are connected via a guide system which maintains the connection between the focus and mirror carriages while said skew and process registration corrections are being provided.

3. The system of claim 2 wherein said guide system includes a plurality of protuberances affixed to the focus carriage, a plurality of matching spherical nubs affixed to the mirror carriage, said nubs maintaining sliding contact with said protuberance surfaces while said skew and process registration correction are being provided.

4. The system of claim 3 further including a plurality of springs fixedly attached to the focus and mirror carriage.

5. The system of claim 1 wherein said diode laser arrays on each side of the polygon scanner are mounted in a lens barrel assembly which also houses the collimating optical means.

* * * * *

UNITED STATES PATENT AND TRADEMARK OFFICE
CERTIFICATE OF CORRECTION

PATENT NO.  : 5,351,070
DATED       : September 27, 1994
INVENTOR(S) : John H. Hinton, et al It is certified that error appears in the above-indentified patent and that said Letters Patent is hereby corrected as shown below:

On the title page: Item [54] and Column 1, line i change "SINGLE PASS COLOR PRINTER HAVING IMPROVED PROCESS AND SLOW REGISTRATION" to

-- SINGLE PASS COLOR PRINTER HAVING IMPROVED PROCESS AND SKEW REGISTRATION --.

Signed and Sealed this

Twenty-first Day of February, 1995

Attest:

BRUCE LEHMAN

*Attesting Officer*               *Commissioner of Patents and Trademarks*